(12) United States Patent
Syvaranta

(10) Patent No.: US 9,768,701 B2
(45) Date of Patent: Sep. 19, 2017

(54) SYNCHRONOUS RECTIFIER CONTROL USING SENSING OF ALTERNATING CURRENT COMPONENT

(71) Applicant: Efore Oyj, Espoo (FI)

(72) Inventor: Lauri Syvaranta, Helsinki (FI)

(73) Assignee: EFORE OYJ, Espoo (FI)

( * ) Notice: Subject to any disclaimer, the term of this patent is extended or adjusted under 35 U.S.C. 154(b) by 69 days.

(21) Appl. No.: 14/565,768

(22) Filed: Dec. 10, 2014

(65) Prior Publication Data
US 2015/0180357 A1 Jun. 25, 2015

(30) Foreign Application Priority Data

Dec. 20, 2013 (EP) ..................... 13198734

(51) Int. Cl.
H02M 1/08 (2006.01)
H02M 7/217 (2006.01)
H02M 3/335 (2006.01)

(52) U.S. Cl.
CPC ... *H02M 3/33546* (2013.01); *H02M 3/33592* (2013.01); *Y02B 70/1433* (2013.01); *Y02B 70/1475* (2013.01); *Y02P 80/112* (2015.11)

(58) Field of Classification Search
CPC ........ H02M 1/08; H02M 3/335; H02M 7/127; H02M 7/217
USPC ............................................. 363/17, 89, 127
See application file for complete search history.

(56) References Cited

U.S. PATENT DOCUMENTS

| | | | |
|---|---|---|---|
| 4,922,404 A * | 5/1990 | Ludwig | H02M 7/2173 363/127 |
| 6,246,593 B1 * | 6/2001 | Cheng | H02M 3/33592 363/127 |
| 6,462,965 B1 | 10/2002 | Uesono | |
| 7,173,835 B1 * | 2/2007 | Yang | H02M 1/16 363/127 |
| 7,184,280 B2 | 2/2007 | Sun et al. | |
| 2005/0270001 A1 | 12/2005 | Jitaru | |
| 2006/0187692 A1 | 8/2006 | Elferich et al. | |
| 2009/0016083 A1 | 1/2009 | Soldano et al. | |

(Continued)

FOREIGN PATENT DOCUMENTS

WO 01/28079 A1 4/2001

OTHER PUBLICATIONS

EP Search Report, dated May 19, 2014, from corresponding EP application.

*Primary Examiner* — Jeffrey Sterrett
(74) *Attorney, Agent, or Firm* — Young & Thompson

(57) ABSTRACT

A synchronous rectifier comprises at least one rectification switch (102, 103), and a control circuit (104) for controlling the at least one rectification switch to allow unidirectional current flow only. The control circuit comprises at least one current sensor (105, 106) for sensing an alternating component of current of the at least one rectification switch, and at least one driver circuit (107, 108) for controlling the at least one rectification switch at least partly on the basis of the direction of the sensed alternating component. Using the alternating component for controlling the rectification switch removes a need to compare the current to any non-zero constant or adjustable threshold value, and thus challenges related to defining the threshold value can be avoided. The synchronous rectifier can be for example a part of a resonant converter.

18 Claims, 4 Drawing Sheets

(56) References Cited

U.S. PATENT DOCUMENTS

2011/0038182 A1* 2/2011 Li ................... H02M 3/33592
  363/21.06
2015/0180357 A1* 6/2015 Syvaranta ......... H02M 3/33546
  363/17

* cited by examiner

SYNCHRONOUS RECTIFIER CONTROL USING SENSING OF ALTERNATING CURRENT COMPONENT

FIELD OF THE INVENTION

The invention relates generally to synchronous rectification. More particularly, the invention relates to a synchronous rectifier than can be, for example but not necessarily, a part of a resonant converter. Furthermore, the invention relates to a method for controlling a synchronous rectifier.

BACKGROUND

In many cases where modern efficiency requirements are to be fulfilled, synchronous rectifiers "SR" need to be used instead of ordinary diode or thyristor rectifiers. In synchronous rectifiers, the operation of a rectification diode or thyristor is mimicked with a controllable rectification switch whose voltage-drop in the conducting state is smaller than that of a diode or a thyristor. The controllable rectification switch can be for example a metal oxide semiconductor field effect transistor "MOSFET".

A synchronous rectifier can be for example a part of a secondary side of a switched mode power supply "SMPS". In many traditional switched mode power supply topologies such as e.g. the flyback topology, the operation of the secondary side is in phase with the operation of the primary side, which makes it relatively easy to implement the control of the synchronous rectifier with the aid of control signals of the primary side. In conjunction with resonant converters, the situation is, however, more complicated because a resonant converter comprises a resonance circuit which is supplied by switched mode voltage controlled by the primary switches and which is connected to the primary winding of the transformer of the resonant converter. The absolute value and the angle of the impedance of the resonance circuit are frequency dependent. Hence, the amplitude of the current supplied to the primary winding of the transformer can be controlled by altering the frequency of the fundamental component of the switched mode voltage. The amount of power transferred to the output of the resonant converter can thus be controlled by altering the above-mentioned frequency. The frequency dependent impedance of the resonance circuit causes a frequency dependent phase-shift between the operation of the primary side and the operation of the secondary side of the resonant converter, where the phase-shift depends on the frequency of the fundamental component of the switched mode voltage. Due to the frequency dependent phase-shift, the control signals of the primary switches are not directly applicable for controlling the rectification switches of the secondary side of the resonant converter. Resonant converters provide, however, significant advantages because zero voltage switching "ZVS" conditions or zero current switching "ZCS" conditions can be arranged for the primary and/or secondary switches, and thus the switching losses can be reduced.

Publication U.S. Pat. No. 7,184,280 describes a method for taking the above-mentioned frequency dependent phase-shift into account when generating control signals for the rectification switches of the secondary side of a resonant converter. The method relies, however, on having a sufficiently accurate model of the resonant converter. Inaccuracies between the model and the physical device lead to increased safety margins that in turn lead to increased losses in the rectification switches.

Another principle for controlling rectification switches is based on measuring currents of the rectification switches. For example, when a MOSFET is used for mimicking a diode, the MOSFET can be driven on when current starts flowing through its parasitic diode and driven off when the current stops. In conjunction with some commercial circuits, the current measurement is based on the voltage-drop over a current conducting rectification switch. This method is however not very robust, because it involves measuring millivolt level signals in an environment that can be very noisy like in a case of an SMPS. The current can also be measured using a current transformer. The current to be measured flows in the primary winding of the current transformer, and the current of the secondary winding of the current transformer can be rectified and transformed into a voltage signal using a shunt resistor, or reverse-parallel connected diodes, or some other suitable electrical entity comprising one or more electrical components. With suitable design of the current transformer, the voltage level can be in the range of volts instead of millivolts, which makes robust measurement much more feasible. In order to detect a situation where the current is flowing and also a situation where the current is off, the signal indicative of the measured current is typically compared with a threshold value. The rectification switch is controlled to be in the conductive state when the signal reaches the threshold value, whereas the rectification switch is not controlled to be in the conductive state when the signal is below the threshold value. In conjunction with an SMPS, the above-described principle is however not free from challenges. One of the challenges is related to the tendency to oscillatory behavior when loading is such that the current is in the vicinity of its threshold value. When the current drops below the threshold value, the rectification switch is no longer controlled to be conductive and the current flows via the parasitic diode of the rectification switch. As a corollary, the voltage-drop over the rectification switch increases. This causes that the output voltage of the SMPS drops and the control of the SMPS takes control actions to increase the output voltage. As a corollary of the control actions, the current increases and it may exceed the threshold value. This causes that the rectification switch is controlled to be conductive and thus its voltage-drop decreases. As a corollary, the output voltage of the SMPS increases, and the control of the SMPS takes control actions to decrease the output voltage. This may cause in turn that the current drops again below the threshold value. The above-described chain of actions can repeat itself and thus the oscillatory behavior takes place. The threshold value can be varied based on the load. This can alleviate the above-described issue, but adds complexity to the control circuit.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying and non-limiting embodiments of the invention.

In accordance with the invention, there is provided a new synchronous rectifier than can be, for example but not necessarily, a part of a resonant converter or another switched mode power supply. A synchronous rectifier according to the invention comprises:
- at least one rectification switch, and
- a control circuit for controlling the at least one rectification switch to allow unidirectional current flow only.

The control circuit comprises:
- at least one current sensor for sensing an alternating component of current of the at least one rectification switch so that a direction of only the alternating component of the current of the at least one rectification switch is sensed, the alternating component being free from a direct current component, and
- at least one driver circuit for controlling the at least one rectification switch on the basis of the sensed direction.

Using the sensed alternating component for controlling the rectification switch removes a need to compare the current of the rectification switch to any non-zero constant or adjustable threshold value. Thus, the challenges related to defining the threshold value can be avoided. The alternating component can be obtained with a current transformer. In principle it is also possible to use another type of current sensor which can be based on for example the Hall-effect and which comprises a filter for removing the direct current component. The implementation based on the current transformer is however robust and cost effective because the current transformer inherently removes the direct current component.

In accordance with the invention, there is provided also a new resonant converter. A resonant converter according to the invention comprises:
- a bridge circuit for receiving input voltage and comprising at least one pair of primary switches,
- a resonance circuit connected to the bridge circuit and capable of being driven by the bridge circuit,
- a transformer comprising a primary winding and secondary windings, the primary winding being connected to the resonant circuit, and
- a synchronous rectifier according to the invention and connected to the secondary windings of the transformer and arranged to provide output voltage of the resonant converter.

In accordance with the invention, there is provided also a new method for control-ling a synchronous rectifier, wherein the synchronous rectifier comprises at least one rectification switch for allowing unidirectional current flow only. A method according to the invention comprises:
- sensing an alternating component of current of the at least one rectification switch so that a direction of only the alternating component of the current of the at least one rectification switch is sensed, the alternating component being free from a direct current component, and
- controlling the at least one rectification switch on the basis of the sensed direction.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which.

DESCRIPTION OF EXEMPLIFYING EMBODIMENTS

Figure 1A:
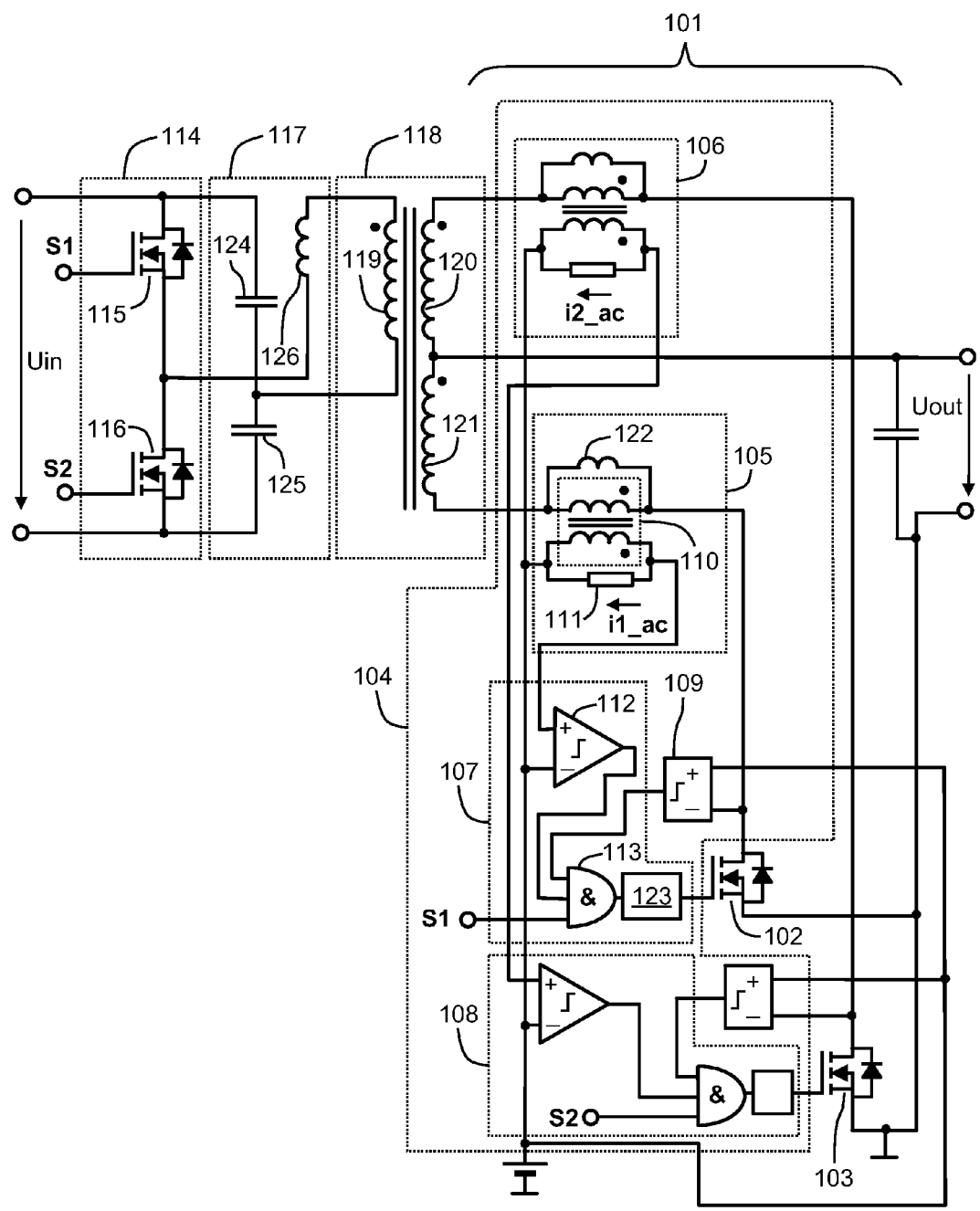
FIG. 1a illustrates a circuit diagram of a resonant converter comprising a synchronous rectifier according to an exemplifying and non-limiting embodiment of the invention.

FIG. 1a illustrates a circuit diagram of a resonant converter that comprises a synchronous rectifier 101 according to an exemplifying and non-limiting embodiment of the invention. The resonant converter comprises a bridge circuit 114 for receiving input voltage Uin and arranged to generate switched mode voltage. In this exemplifying case, the bridge circuit comprises one pair of primary switches 115 and 116. It is also possible that the bridge circuit is a full-bridge which comprises two pairs of primary switches. The primary switches 115 and 116 can be for example metal oxide semiconductor field effect transistors "MOSFET". The resonant converter comprises a resonance circuit 117 connected to the bridge circuit 114 and capable of being driven by the bridge circuit. The resonant converter comprises a transformer 118 comprising a primary winding 119 and secondary windings 120 and 121. The primary winding is connected to the resonant circuit 117. In this exemplifying case the resonance circuit 117 comprises an inductor 126 and capacitors 124 and 125. The stray inductance of the primary winding 119 is in series with the inductor 126, and thus the stray inductance of the primary winding can be considered to be a part of the resonance circuit 117. It is also possible that the transformer 118 is designed so that the stray inductance of the primary winding 119 is sufficient alone and thus no separate inductor, such as the inductor 126, is needed. It is also possible that the magnetizing inductance of the transformer 118 constitutes a part of the resonance circuit. The absolute value and the angle of the impedance of the resonance circuit 117 are frequency dependent. Hence, the amplitude of the current supplied to the primary winding 119 can be controlled by altering the frequency of the fundamental component of the switched mode voltage produced by the bridge circuit 114. The amount of power transferred to the output of the resonant converter can thus be controlled by altering the above-mentioned frequency. Furthermore, the resonance circuit 117 causes a phase-shift between the fundamental components of the switched mode voltage produced by the bridge circuit 114 and of the current in the primary winding 119.

The synchronous rectifier 101 is connected to the secondary windings 120 and 121 of the transformer 118. The synchronous rectifier is arranged to provide the output voltage Uout of the resonant converter. The synchronous rectifier 101 comprises rectification switches 102 and 103, and a control circuit 104 for controlling the rectification switches to carry out half-wave rectifications of input currents of the synchronous rectifier. In this case, the input currents of the synchronous rectifier are the currents of the secondary windings 120 and 121 of the transformer 118. The rectification switches 102 and 103 can be for example metal oxide semiconductor field effect transistors "MOSFET". The control circuit 104 comprises a current sensor 105 for sensing an alternating component of the current of the rectification switch 102, and a current sensor 106 for sensing an alternating component of the current of the rectification switch 103, where the sensed alternating components are substantially free from direct current components. The synchronous rectifier 101 comprises a driver circuit 107 for controlling the rectification switch 102 at least partly on the basis of the direction of the sensed alternating component of the current of the rectification switch 102, and a driver circuit 108 for controlling the rectification switch 103 at least partly on the basis of the direction of the sensed alternating component of the current of the rectification switch 103.

In the exemplifying resonant converter illustrated in FIG. 1*a*, each current sensor comprises a current transformer and a shunt resistor connected in parallel with a secondary winding of the current transformer so as to provide a voltage signal responsive to the alternating component of the current of the corresponding rectification switch. In FIG. 1*a*, the current transformer of the current sensor 105 is denoted with a reference number 110, and the shunt resistor of the current sensor 105 is denoted with a reference number 111. Instead of the mere shunt resistor 111, there can be reverse-parallel connected diodes, or reverse-parallel connected diode-resistor chains, or some other suitable electrical entity comprising one or more electrical components which may include e.g. a bypass capacitor in parallel with the secondary winding of the current transformer. The sensed alternating component of the current of the rectification switch 102 is denoted as i1_ac and its positive direction in the shunt resistor 111 is denoted with an arrow shown below the shunt resistor 111. The current transformer 110 may have a ferromagnetic or non-ferromagnetic core, and the detailed design of the current transformer depends on case specific factors. Each current sensor may further comprise an additional inductor that is parallel with the primary winding of the current transformer. The additional inductor of the current sensor 105 is denoted with a reference number 122 in FIG. 1*a*. With the aid of the additional inductor 122, it is possible to adjust the voltage-drop caused by the current sensor 105. Each driver circuit comprises a comparator for detecting polarity of the voltage signal provided by the shunt resistor and a signal path for controlling the corresponding rectification switch at least partly on the basis of an output signal of the comparator. In FIG. 1*a*, the comparator of the driver circuit 107 is denoted with a reference number 112.

Figure 1B:
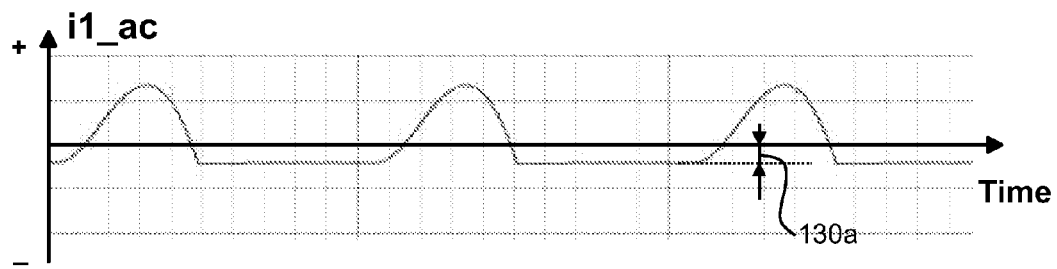
FIG. 1b shows a waveform of an alternating component of current of a rectification switch of the synchronous rectifier illustrated in FIG. 1a in an exemplifying situation.
Figure 1C:
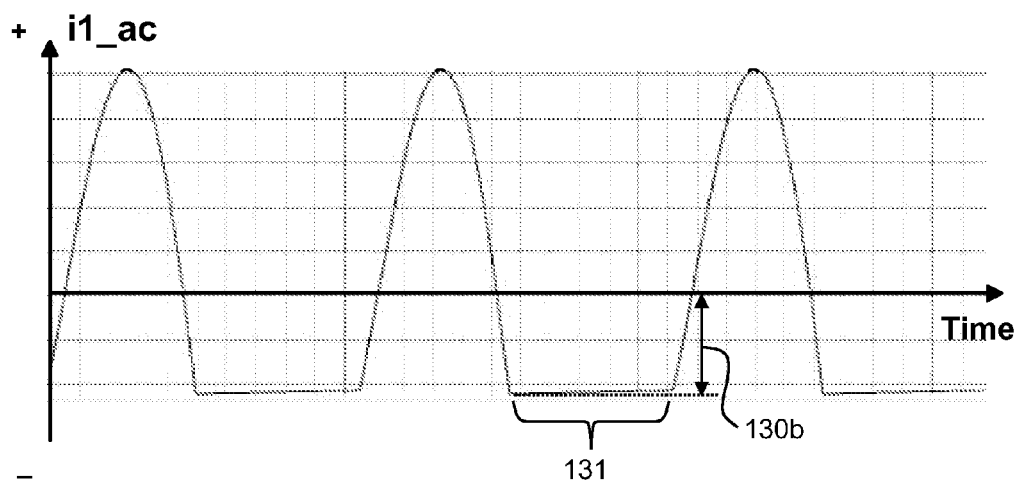
FIG. 1c shows the waveform of the alternating component of the current of the rectification switch of the synchronous rectifier illustrated in FIG. 1a in another exemplifying situation.

FIG. 1*b* shows a waveform of the sensed alternating component i1_ac of the current of the rectification switch 102 in a first exemplifying situation, and FIG. 1*c* shows the waveform of the i1_ac in a second exemplifying situation where the load of the resonant converter is greater than in the first exemplifying situation.

In a resonant converter according to an exemplifying and non-limiting embodiment of the invention, the driver circuit 107 is arranged to control the rectification switch 102 to be in the conductive state when the sensed alternating component i1_ac has the direction of the arrow shown below the shunt resistor 111 in FIG. 1*a*. The direction of the arrow corresponds to positive values of i1_ac in FIGS. 1*b* and 1*c*. Correspondingly, the driver circuit 108 is arranged to control the rectification switch 103 to be in the conductive state when the sensed alternating component i2_ac of the current of the rectification switch 103 has the direction of an arrow shown below the shunt resistor of the current sensor 106. Each of quantities 130*a* and 130*b* illustrated in FIGS. 1*b* and 1*c* corresponds actually a threshold value which has to be exceeded by the current of the rectification switch 102, i.e. by the current which includes the direct current component, in order that the rectification switch 102 is controlled to be in the conductive state. As can be seen from FIGS. 1*b* and 1*c*, the corollary of using the alternating component i1_ac which is substantially free from the direct current component, is that the threshold value is automatically adapted in accordance with the load. The current of the rectification switch 102 is zero during the time interval 131 shown in FIG. 1*c*. The sensed alternative component i1_ac deviates from the real alternative component in the respect that the sensed alternative component i1_ac is not constant during this time interval 131 because the shunt resistor 111 consumes energy stored by the current transformer 110. The sensed i1_ac during the time interval 131 is approximately i1_ac_0×e$^{-tR/L}$, where i1_ac_0 is i1_ac at the beginning of the time interval 131 so that the switching peaks are neglected, t is time measured from the beginning of the time interval 131, R is the resistance of the shunt resistor 111, and L is the sum of the magnetizing inductance of the current transformer 110 and the stray-inductance of the secondary winding of the current transformer. In a case where there is the additional inductor 122, also the additional inductor 122 has an effect on the operation during the time interval 131.

In a resonant converter according to an exemplifying and non-limiting embodiment of the invention, the control circuit 104 of the synchronous rectifier 101 further comprises voltage sensors arranged to sense voltages of current outputting terminals of the rectification switches 102 and 103. The control circuit 104 is arranged to control each rectification switch to be in the conductive state only when the sensed voltage of the current outputting terminal of the rectification switch under consideration is below a pre-determined limit. In FIG. 1*a*, one of the voltage sensors is denoted with a reference number 109. The voltage sensor 109 indicates whether the voltage of the current outputting terminal of the rectification switch 102 is below the above-mentioned pre-determined limit. The pre-determined limit is advantageously chosen so that the voltage over the rectification switch 102 is not in the reverse direction of the parasitic diode of the rectification switch 102 when the voltage of the current outputting terminal of the rectification switch 102 is below the pre-determined limit.

In a resonant converter according to an exemplifying and non-limiting embodiment of the invention, each driver circuit of the synchronous rectifier 101 comprises an AND-gate whose one input is arranged to receive the signal indicative of the direction of the alternating component of the current of the corresponding rectification switch and whose other input is arranged to receive a signal indicative of whether the voltage of the current outputting terminal of the rectification switch is below the pre-determined limit. In FIG. 1a, the AND-gate of the driver circuit 107 is denoted with a reference number 113.

In a resonant converter according to an exemplifying and non-limiting embodiment of the invention, the control circuit 104 of the synchronous rectifier 101 comprises signal inputs for receiving information indicative of control signals S1 and S2 of the primary switches 115 and 116. The control circuit is arranged to allow each rectification switch to be in the conductive state only when a particular one of the primary switches is in the conductive state. In the exemplifying case illustrated in FIG. 1a, the rectification switch 102 is allowed to be conductive only when the primary switch 115 is in the conductive state, and the rectification switch 103 is allowed to be conductive only when the primary switch 116 is in the conductive state. This can be implemented for example so that each driver circuit comprises an AND-gate whose one input is arranged to receive a status signal indicative of whether an appropriate primary switch is in the conductive state. In a case where the resonant converter comprises a full-bridge in its primary side, the status signal is indicative whether appropriate two primary switches are in the conductive state. The signal path from the output of the AND-gate to the gate of the corresponding rectification switch may further comprise adapting means for adapting the output signal of the AND-gate to be suitable for driving the gate of the rectification switch. In FIG. 1a, the adapting means of the driver circuit 107 are denoted with a reference number 123.

Figure 2:
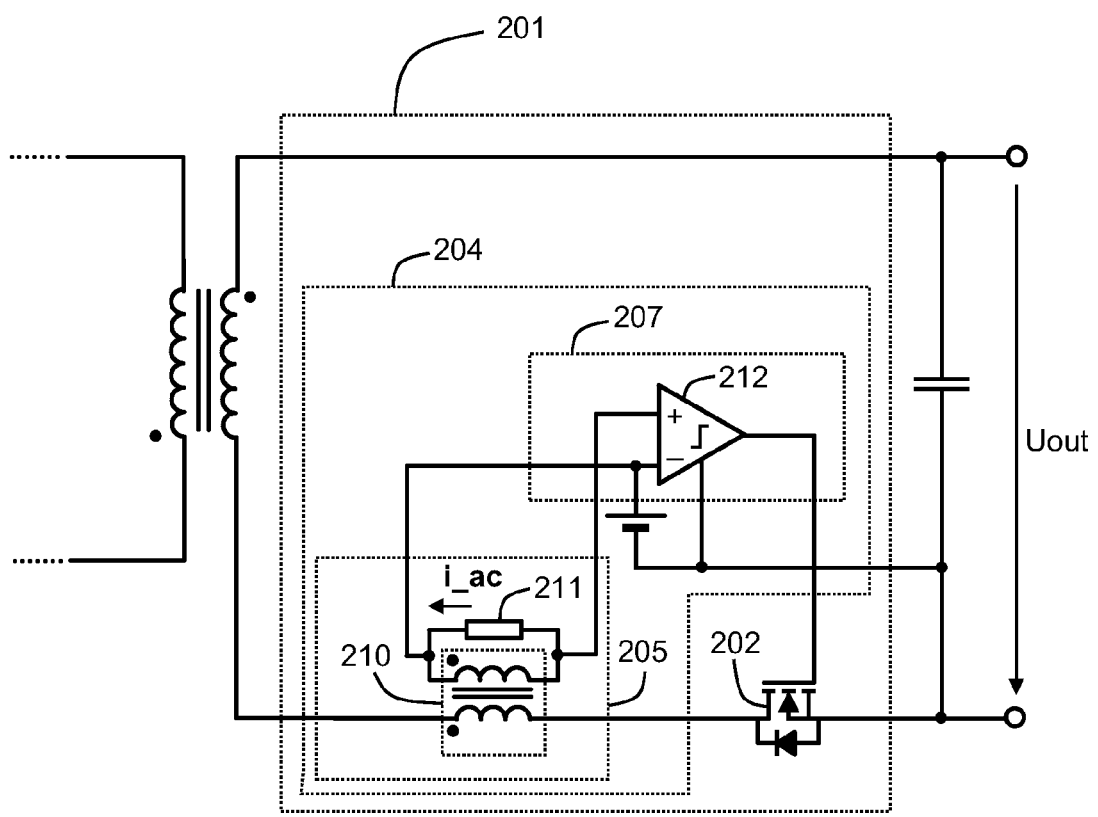
FIG. 2 illustrates a circuit diagram of a synchronous rectifier according to an exemplifying and non-limiting embodiment of the invention.

FIG. 2 illustrates a circuit diagram of a synchronous rectifier 201 according to an exemplifying and non-limiting embodiment of the invention. In this exemplifying case, the synchronous rectifier is a half-wave rectifier. The synchronous rectifier comprises a rectification switch 202, and a control circuit 204 for controlling the rectification switch to allow unidirectional current flow only. The control circuit 204 comprises a current sensor 205 for sensing an alternating component i_ac of current of the rectification switch 202, where the alternating component is substantially free from a direct current component. The control circuit 204 comprises a driver circuit 207 for controlling the rectification switch 202 on the basis of the direction of the sensed alternating component i_ac. The current sensor 205 comprises a current transformer 210 and a shunt resistor 211 connected in parallel with a secondary winding of the current transformer so as to provide a voltage signal responsive to the alternating component i_ac. The driver circuit 207 comprises a comparator 212 for detecting polarity of the voltage signal and for controlling the rectification switch 202 accordingly.

Figure 3:
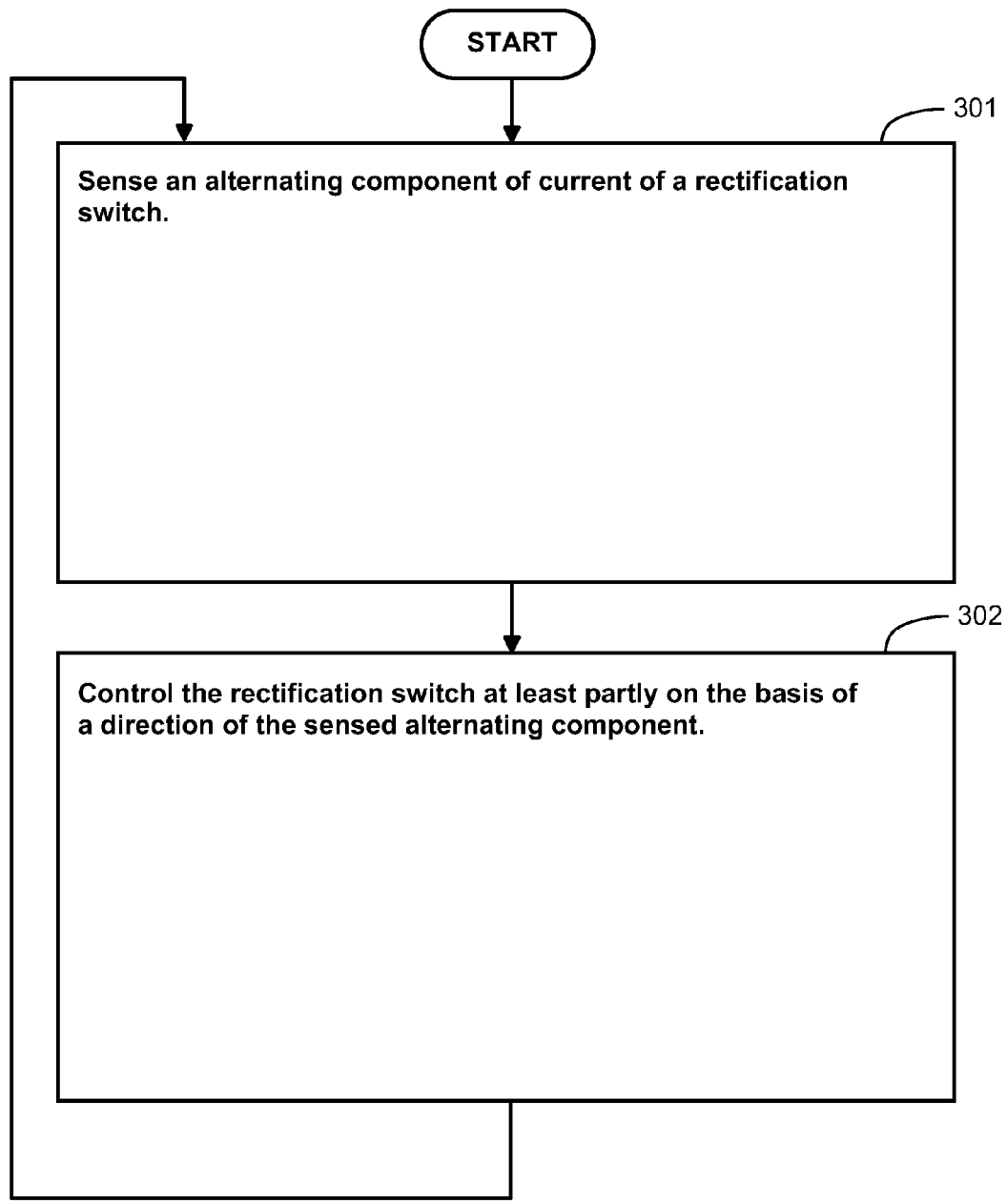
FIG. 3 shows a flow chart of a method according to an exemplifying and non-limiting embodiment of the invention for controlling a synchronous rectifier.

FIG. 3 shows a flow chart of a method according to an exemplifying and non-limiting embodiment of the invention for controlling a synchronous rectifier that comprises at least one rectification switch for allowing unidirectional current flow only. The method comprises the following actions:

action 301: sensing an alternating component of current of the at least one rectification switch, the alternating component being substantially free from a direct current component, and action 302: controlling the at least one rectification switch at least partly on the basis of the direction of the sensed alternating component of the current of the rectification switch.

In a method according to an exemplifying and non-limiting embodiment of the invention, the rectification switch is controlled to be in the conductive state only when the sensed alternating component of the current of the rectification switch has a pre-determined direction that corresponds to the direction in which the current is allowed to flow through the rectification switch.

A method according to an exemplifying and non-limiting embodiment of the invention further comprises sensing voltage of a current outputting terminal of the rectification switch, and allowing the rectification switch to be in the conductive state only when the sensed voltage of the current outputting terminal of the rectification switch is below a pre-determined limit.

In a method according to an exemplifying and non-limiting embodiment of the invention, the alternating component of the current of the rectification switch is sensed with a current transformer and with a shunt resistor connected in parallel with a secondary winding of the current transformer so as to provide a voltage signal responsive to the alternating component of the current of the rectification switch.

A method according to an exemplifying and non-limiting embodiment of the invention comprises detecting polarity of the above-mentioned voltage signal and controlling the rectification switch at least partly on the basis of the detected polarity of the voltage signal.

In a method according to an exemplifying and non-limiting embodiment of the invention, the rectification switch is controlled with an output signal of an AND-gate whose one input receives a signal indicative of the detected polarity of the above-mentioned voltage signal and whose one or more other inputs receive at least one of the following: a) a signal indicative of whether the voltage of the current outputting terminal of the rectification switch is below the pre-determined limit, b) one or more control signals received from outside the synchronous rectifier.

In a method according to an exemplifying and non-limiting embodiment of the invention, the synchronous rectifier is a part of a resonant converter comprising:
   a bridge circuit for receiving input voltage and comprising at least one pair of primary switches,
   a resonance circuit connected to the bridge circuit and capable of being driven by the bridge circuit,
   a transformer comprising a primary winding connected to the resonant circuit and secondary windings connected to the synchronous rectifier.

A method according to an exemplifying and non-limiting embodiment of the invention further comprises receiving information indicative of control signals of the primary switches, and allowing the rectification switch to be in the conductive state only when a particular one of the primary switches is in the conductive state. The rectification switch can be controlled for example with an output signal of an AND-gate whose one input receives a signal indicative of whether the particular one of the primary switches is in the conductive state.

The specific, non-limiting examples provided in the description given above should not be construed as limiting the scope and/or the applicability of the appended claims.

What is claimed is:

1. A synchronous rectifier comprising:
   at least one rectification switch, and
   a control circuit for controlling the at least one rectification switch to allow unidirectional current flow only,
   wherein the control circuit comprises:
      at least one current sensor for sensing an alternating component of current of the at least one rectification switch so that a direction of only the alternating component of the current of the at least one rectification switch is sensed, the alternating component being free from a direct current component, and at least one driver circuit for controlling the at least one rectification switch on the basis of the sensed direction.

2. A synchronous rectifier according to claim 1, wherein the driver circuit is arranged to control the rectification switch to be in a conductive state only when the sensed alternating component of the current of the rectification switch has a pre-determined direction.

3. A synchronous rectifier according to claim 1, wherein the control circuit further comprises at least one voltage sensor arranged to sense voltage of a current outputting terminal of the at least one rectification switch, and the control circuit is arranged to allow the rectification switch to be in a conductive state only when the voltage of the current outputting terminal of the rectification switch is below a predetermined limit.

4. A synchronous rectifier according to claim 1, wherein the current sensor comprises a current transformer and an electrical entity comprising one or more electrical components and connected in parallel with a secondary winding of the current transformer so as to provide a voltage signal responsive to the alternating component of the current of the rectification switch.

5. A synchronous rectifier according to claim 4, wherein the driver circuit comprises a comparator for detecting polarity of the voltage signal and a signal path for controlling the rectification switch at least partly on the basis of an output signal of the comparator.

6. A synchronous rectifier according to claim 5, wherein the signal path comprises an AND-gate whose one input is arranged to receive the output signal of the comparator and whose one or more other inputs are arranged to receive at least one of the following: a) a signal indicative of whether voltage of a current outputting terminal of the rectification switch is below a pre-determined limit, b) one or more control signals received from outside the synchronous rectifier.

7. A resonant converter comprising:
a bridge circuit for receiving input voltage and comprising at least one pair of primary switches,
a resonance circuit connected to the bridge circuit and capable of being driven by the bridge circuit,
a transformer comprising a primary winding and secondary windings, the primary winding being connected to the resonant circuit, and
a synchronous rectifier connected to the secondary windings of the transformer and arranged to provide output voltage of the resonant converter,
wherein the synchronous rectifier comprises at least one rectification switch and a control circuit for controlling the at least one rectification switch to allow unidirectional current flow only, the control circuit comprising:
at least one current sensor for sensing an alternating component of current of the at least one rectification switch so that a direction of only the alternating component of the current of the at least one rectification switch is sensed, the alternating component being free from a direct current component, and
at least one driver circuit for controlling the at least one rectification switch on the basis of the sensed direction.

8. A resonant converter according to claim 7, wherein the control circuit of the synchronous rectifier comprises signal inputs for receiving information indicative of control signals of the primary switches, and the control circuit is arranged to allow the rectification switch to be in a conductive state only when a particular one of the primary switches is in the conductive state.

9. A resonant converter according to claim 8, wherein,
the current sensor comprises a current transformer and an electrical entity comprising one or more electrical components and connected in parallel with a secondary winding of the current transformer so as to provide a voltage signal responsive to the alternating component of the current of the rectification switch,
the driver circuit comprises a comparator for detecting polarity of the voltage signal and a signal path for controlling the rectification switch at least partly on the basis of an output signal of the comparator,
the signal path comprises an AND-gate whose one input is arranged to receive the output signal of the comparator and whose one or more other inputs are arranged to receive at least one of the following: a) a signal indicative of whether voltage of a current outputting terminal of the rectification switch is below a pre-determined limit, b) one or more control signals received from outside the synchronous rectifier, and
one of the inputs of the AND-gate is arranged to receive a signal indicative of whether the particular one of the primary switches is in the conductive state.

10. A method for controlling a synchronous rectifier, wherein the synchronous rectifier comprises at least one rectification switch for allowing unidirectional current flow only, the method comprising:
sensing an alternating component of current of the at least one rectification switch so that a direction of only the alternating component of the current of the at least one rectification switch is sensed, the alternating component being free from a direct current component, and
controlling the at least one rectification switch on the basis of the sensed direction.

11. A method according to claim 10, wherein the rectification switch is controlled to be in a conductive state only when the sensed alternating component of the current of the rectification switch has a pre-determined direction.

12. A method according to claim 10, wherein the method further comprises sensing voltage of a current outputting terminal of the rectification switch, and allowing the rectification switch to be in the conductive state only when the sensed voltage of a current outputting terminal of the rectification switch is below a pre-determined limit.

13. A method according to claim 10, wherein the alternating component of the current of the rectification switch is sensed with a current transformer and with an electrical entity comprising one or more electrical components and connected in parallel with a secondary winding of the current transformer so as to provide a voltage signal responsive to the alternating component of the current of the rectification switch.

14. A method according to claim 13, wherein the method comprises detecting polarity of the voltage signal and controlling the rectification switch at least partly on the basis of the detected polarity of the voltage signal.

15. A method according to claim 14, wherein the rectification switch is controlled with an output signal of an AND-gate whose one input receives a signal indicative of the detected polarity of the voltage signal and whose one or more other inputs receive at least one of the following: a) a signal indicative of whether voltage of a current outputting terminal of the rectification switch if below a pre-determined limit, b) one or more control signals received from outside the synchronous rectifier.

16. A method according to claim 10, wherein the synchronous rectifier is a part of a resonant converter comprising:
- a bridge circuit for receiving input voltage and comprising at least one pair of primary switches,
- a resonance circuit connected to the bridge circuit and capable of being driven by the bridge circuit,
- a transformer comprising a primary winding connected to the resonant circuit and secondary windings connected to the synchronous rectifier.

17. A method according to claim 16, wherein the method further comprises receiving information indicative of control signals of the primary switches, and allowing the rectification switch to be in a conductive state only when a particular one of the primary switches is in the conductive state.

18. A method according to claim 17, wherein the rectification switch is controlled with an output signal of an AND-gate whose one input receives a signal indicative of whether the particular one of the primary switches is in the conductive state.

* * * * *